Sept. 6, 1932.    G. J. RICE    1,876,470
WHEEL FENDER
Filed Feb. 10, 1932    2 Sheets-Sheet 1

Inventor
George J. Rice

By Clarence A. O'Brien
Attorney

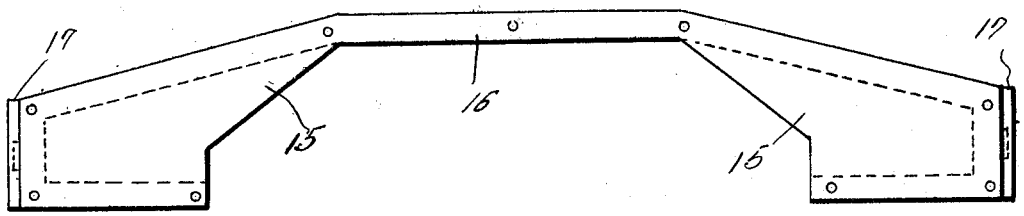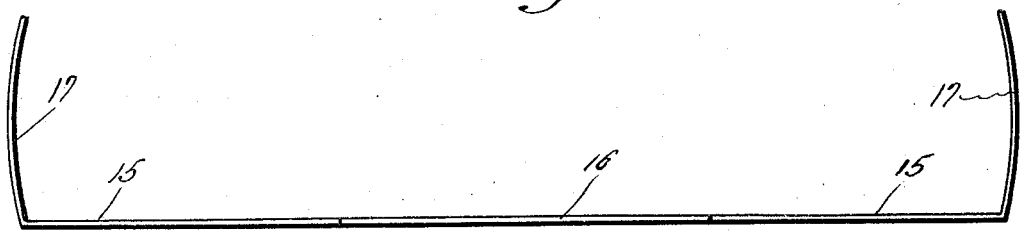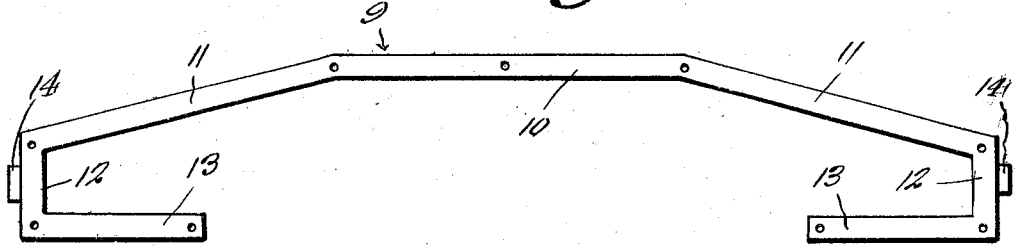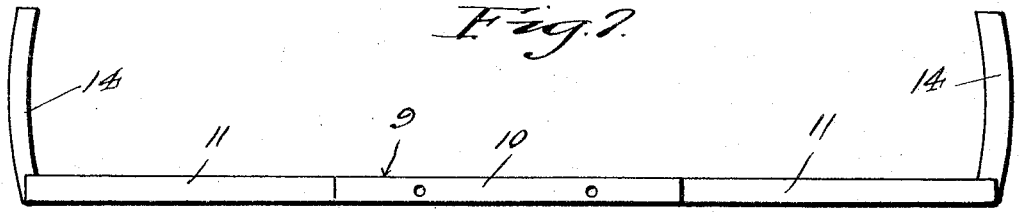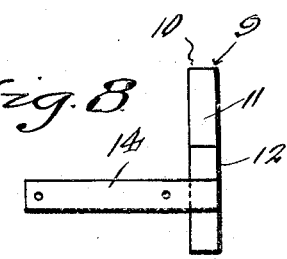

Patented Sept. 6, 1932

1,876,470

UNITED STATES PATENT OFFICE

GEORGE J. RICE, OF DORCHESTER, MASSACHUSETTS

WHEEL FENDER

Application filed February 10, 1932. Serial No. 592,167.

This invention relates to new and useful improvements in accident prevention devices particularly adapted for railroad rolling stock wheels.

The principal object of this invention is to provide a shield or guard for disposition in front of the wheels of rolling stock to brush off of a track rail the foreign matter that may chance to be thereon.

Other important objects and advantages of the invention will become apparent to the reader of the following specification.

In the drawings:—

Fig. 4 represents a side elevational view of one of the fenders.

Fig. 5 represents a top plan view of one of the fenders.

Fig. 6 represents a side elevational view of the frame of one of the fenders.

Fig. 7 represents a top plan view of the frame of one of the fenders.

Fig. 8 represents an end elevational view of the frame shown in Fig. 7.

Figure 1:
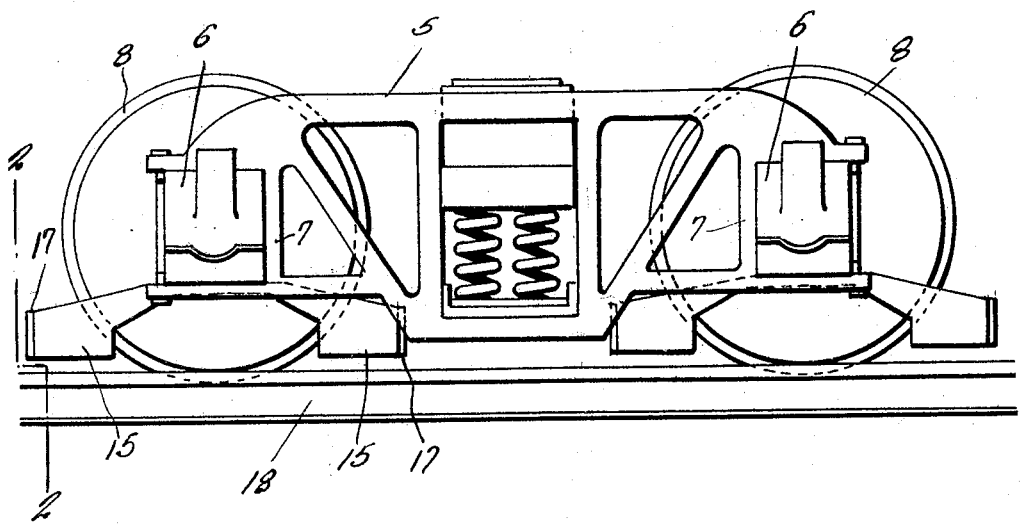
Figure 1 represents a side elevational view of a wheeled truck of a piece of rolling stock, showing the fenders in position.
Figure 2:
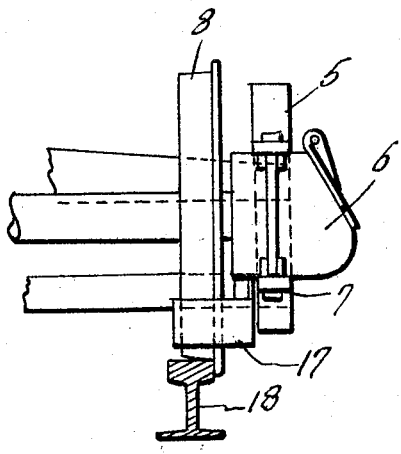
Fig. 2 represents a sectional view taken substantially on line 2—2 of Fig. 1.
Figure 3:
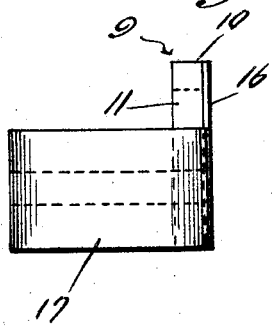
Fig. 3 represents a front elevational view of one of the fenders.

Referring to the drawings wherein like numerals designate like parts, it can be seen that numeral 5 denotes the carriage of a railroad wheel truck with the usual journal boxes 6—6 mounted thereon in their saddles 7. Numeral 8 is applied to each of the wheels shown on one side of the truck in Fig. 1, and it will be observed, that one heel or guard unit suffices for each wheel 8 regardless of which direction the truck is travelling.

In carrying out the invention, it can be seen that for each wheel a frame 9 is employed, the same consisting of a horizontal bar 10 having downwardly sloping extensions 11—11 at its ends. The lower ends of these portions 11—11 are provided with depending members 12—12 which merge into backwardly disposed extensions 13—13. The horizontal portion 10 is secured to the journal box saddle 7 on the outside of the wheel truck and the arms 14—14 on the depending members 12 extend inwardly in position forwardly and rearwardly of the tread surfaces of the particular wheel 8.

The shield or guard proper is constructed of some suitable sheet material and consists of a pair of plates 15—15 connected by the narrow bridge piece 16 which is secured to the intermediate bar 10 of the frame 9. The lower perimeters of the plates 15—15 are secured to the lower members 13—13 of the frame. Buffer plates 17—17 are secured to the inwardly extending arms 14—14, and these plates 17—17 are the elements which actually engage foreign material on the track rail 18 and serve to keep the rails clear of all obstructions to the end that the property of the railroad will be safeguarded against wreckage and that injury to persons by being run over will be materially lessened.

While the foregoing specification sets forth in specific terms, it is to be understood that numerous changes in the shape, size and materials may be resorted to without departing from the spirit and scope of the invention as claimed hereinafter.

Having thus described my invention, what I claim as new is:—

A vehicle wheel guard comprising an elongated frame piece provided with inwardly disposed end portions, a laterally disposed frame piece at each end of the first-mentioned frame piece, a plate secured to the first-mentioned frame piece and to the inwardly disposed end portions thereof, and a buffer plate secured to the laterally disposed frame pieces at the ends of the first-mentioned frame piece.

In testimony whereof I affix my signature.

GEORGE J. RICE.